(12) United States Patent
Geng et al.

(10) Patent No.: US 12,035,149 B2
(45) Date of Patent: Jul. 9, 2024

(54) COMMUNICATION METHOD AND APPARATUS

(71) Applicant: HUAWEI TECHNOLOGIES CO., LTD., Shenzhen (CN)

(72) Inventors: Tingting Geng, Shanghai (CN); Le Yan, Shenzhen (CN); Hongping Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 522 days.

(21) Appl. No.: 17/239,046

(22) Filed: Apr. 23, 2021

(65) Prior Publication Data
US 2021/0243614 A1  Aug. 5, 2021

Related U.S. Application Data

(63) Continuation of application No. PCT/CN2019/112987, filed on Oct. 24, 2019.

(30) Foreign Application Priority Data

Oct. 25, 2018 (CN) .......................... 201811252098.4

(51) Int. Cl.
*H04W 16/26* (2009.01)
*H04W 24/02* (2009.01)
*H04W 24/08* (2009.01)
*H04W 74/0833* (2024.01)

(52) U.S. Cl.
CPC ........... *H04W 16/26* (2013.01); *H04W 24/02* (2013.01); *H04W 24/08* (2013.01); *H04W 74/0833* (2013.01)

(58) Field of Classification Search
CPC ..... H04W 16/26; H04W 24/02; H04W 24/08; H04W 74/0833
See application file for complete search history.

(56) References Cited

U.S. PATENT DOCUMENTS

| | | | |
|---|---|---|---|
| 2016/0295609 A1 | 10/2016 | Vajapeyam et al. | |
| 2017/0105166 A1* | 4/2017 | Lee .................. | H04W 72/23 |
| 2018/0063722 A1 | 3/2018 | Lee et al. | |

FOREIGN PATENT DOCUMENTS

| | | |
|---|---|---|
| CN | 105659687 A | 6/2016 |
| CN | 107135473 A | 9/2017 |
| CN | 107432042 A | 12/2017 |

(Continued)

OTHER PUBLICATIONS

CMCC: "DL and UL CE level non-corresponding issue in NB IoT", 3GPP Draft; R1-1721113, Nov. 27, 2017-Dec. 1, 2017, 3 pages.
(Continued)

*Primary Examiner* — Mohammad S Anwar
(74) *Attorney, Agent, or Firm* — HAUPTMAN HAM, LLP

(57) ABSTRACT

A communication method and apparatus to improve communication efficiency. The method includes: determining downlink signal quality; determining a downlink coverage enhancement CE level of a terminal device based on the downlink signal quality and a first CE level quality threshold; and determining first uplink CE level of the terminal device based on the downlink signal quality and a second CE level quality threshold, where the first CE level quality threshold is different from the second CE level quality threshold.

20 Claims, 5 Drawing Sheets

(56) References Cited

FOREIGN PATENT DOCUMENTS

| CN | 108684017 A | 10/2018 |
| WO | 2016163734 A1 | 10/2016 |
| WO | WO-2017061939 A1 * | 4/2017 |

OTHER PUBLICATIONS

Mediatek Inc: "Support Initial Access on Supplementary Uplink", 3GPP Draft; R2-1708050, Aug. 21, 2017-Aug. 25, 2017, 3.
European Search Report issued in corresponding European Application No. 19877199.0, dated Nov. 8, 2021, pp. 1-16, European Patent Office, Munich, Germany.
CATT, Consideration on random access for R13 eMTC. 3GPP TSG RAN WG2 Meeting #91, Beijing, China, Aug. 24-28, 2015, R2-153485, 5 pages.
CMCC, DL and UL CE level non-corresponding issue in NB-Iot. 3GPP TSG-RAN WG2 Meeting #100, Reno, Nevada, USA, Nov. 27-Dec. 1, 2017, R2-1713239, 3 pages.
International Search Report issued in corresponding International Application No. PCT/CN2019/112987, dated Feb. 3, 2020.
Chinese Office Action issued in corresponding Chinese Application No. 2018112520984, dated Nov. 30, 2020, pp. 1-8.

* cited by examiner

COMMUNICATION METHOD AND APPARATUS

CROSS-REFERENCE TO RELATED APPLICATIONS

This application is a continuation of International Application No. PCT/CN2019/112987, filed on Oct. 24, 2019, which claims priority to Chinese Patent Application No. 201811252098.4, filed on Oct. 25, 2018. The disclosures of the aforementioned applications are hereby incorporated by reference in their entireties.

TECHNICAL FIELD

This application relates to the communications field, and in particular, to a communication method and apparatus.

BACKGROUND

To support a larger coverage depth and better capacity performance, a coverage enhancement (CE) mechanism is introduced into a communications system. The coverage enhancement mechanism may include different CE levels, and a CE level to some extent may reflect a coverage status of an uplink and/or a downlink carrier, or may reflect uplink and/or downlink signal quality at a location. Optionally, the different CE levels may correspond to different quantities of repetitions and/or different modulation schemes. A network side and a terminal device may repeatedly send or receive uplink/downlink data based on the quantities of repetitions corresponding to the CE levels. For example, in a long term evolution (LTE) system, for an area with a relatively high CE level, a quantity of repetitions of uplink and/or downlink data transmission of the terminal device may be reduced or uplink and/or downlink data may not be repeatedly sent. For an area with a relatively low CE level, a quantity of repetitions of uplink and/or downlink data transmission of the terminal device may be increased.

With development of communications technologies, a carrier frequency band is extended to a high frequency, and coverage areas of uplink and downlink carriers are different from those in the LTE system. Therefore, how to communicate based on a CE level in a future communications system is an urgent problem to be resolved in the industry.

SUMMARY

In view of this, embodiments of this application provide a communication method and apparatus, which provides a solution for communication based on a CE level, to improve communication efficiency.

According to a first aspect, a communication method is provided, and the method includes: determining downlink signal quality; determining a downlink coverage enhancement CE level of a terminal device based on the downlink signal quality and a first CE level quality threshold; and determining an uplink CE level of the terminal device based on the downlink signal quality and a second CE level quality threshold, where the first CE level quality threshold is different from the second CE level quality threshold.

In this embodiment of this application, the uplink CE level and the downlink CE level that are of the terminal device may be separately determined based on different CE level quality thresholds, so that signal quality of uplink and downlink carriers can be more accurately indicated by using the CE levels, to improve communication efficiency.

With reference to the first aspect, in a possible implementation, the method further includes: receiving first configuration information from a network device, where the first configuration information is used to indicate a correspondence between an uplink CE level and a random access configuration; determining, based on the correspondence, a first random access configuration corresponding to the uplink CE level of the terminal device; and sending a random access signal based on the first random access configuration.

In this embodiment of this application, the terminal device may report the uplink CE level to the network device by using the random access configuration of the random access signal, and no additional information needs to be sent, so that signaling overheads can be reduced.

With reference to the first aspect, in a possible implementation, the method further includes: receiving second configuration information from a network device, where the second configuration information is used to indicate a correspondence between a random access configuration and a combination of an uplink CE level and a downlink CE level; determining, based on the correspondence, a second random access configuration corresponding to a combination of the uplink CE level and the downlink CE level that are of the terminal device; and sending a random access signal based on the second random access configuration.

In this embodiment of this application, the terminal device may report the uplink CE level and the downlink CE level to the network device by using the random access configuration of the random access signal, and no additional information needs to be sent, so that signaling overheads can be reduced.

With reference to the first aspect, in a possible implementation, the random access configuration includes at least one of the following: information about a random access preamble and a random access resource.

With reference to the first aspect, in a possible implementation, the method further includes: receiving third configuration information from the network device, where the third configuration information is used to indicate the second CE level quality threshold.

With reference to the first aspect, in a possible implementation, the method further includes: receiving fourth configuration information from the network device, where the fourth configuration information is used to indicate a quality threshold difference; and determining the second CE level quality threshold based on the first CE level quality threshold and the quality threshold difference.

In this embodiment of this application, the second CE level quality threshold used to determine the uplink CE level is introduced, and further, the quality threshold difference used to determine the second CE level quality threshold is introduced. The terminal device may determine the uplink CE level based on the second CE level quality threshold, so that the CE level can be more accurately determined, to improve communication efficiency.

With reference to the first aspect, in a possible implementation, the uplink CE level of the terminal device is an uplink CE level of a first uplink carrier, and the method further includes: if the uplink CE level of the first uplink carrier is higher than an uplink CE level of a supplementary uplink SUL carrier, performing uplink transmission by using the SUL carrier, where a frequency of the first uplink carrier is higher than a frequency of the SUL carrier, and a higher uplink CE level indicates a poorer coverage capability corresponding to the uplink CE level; or if the uplink CE level of the first uplink carrier is lower than an uplink CE level of an SUL carrier, performing uplink transmission by using the SUL carrier, where a frequency of the first uplink carrier is higher than a frequency of the SUL carrier, and a higher uplink CE level indicates a stronger coverage capability corresponding to the uplink CE level.

With reference to the first aspect, in a possible implementation, the method further includes: receiving indication information from the network device, where the indication information is used to: if the uplink CE level of the uplink carrier is higher than the uplink CE level of the SUL carrier, indicate to perform uplink transmission by using the SUL carrier, where a higher uplink CE level indicates a poorer coverage capability corresponding to the uplink CE level; or the indication information is used to: if the uplink CE level of the first uplink carrier is lower than the uplink CE level of the SUL carrier, indicate to perform uplink transmission by using the SUL carrier, where the frequency of the first uplink carrier is higher than the frequency of the SUL carrier, and a higher uplink CE level indicates a stronger coverage capability corresponding to the uplink CE level.

According to a second aspect, a communication method is provided, and the method includes: obtaining, by a network device, a downlink coverage enhancement CE level of a terminal device, where the downlink CE level of the terminal device is determined based on downlink signal quality and a first CE level quality threshold; and obtaining, by the network device, an uplink CE level of the terminal device, where the uplink CE level of the terminal device is determined based on the downlink signal quality and a second CE level quality threshold, and the first CE level quality threshold is different from the second CE level quality threshold.

With reference to the second aspect, in a possible implementation, the method further includes: sending, by the network device, first configuration information to the terminal device, where the first configuration information is used to indicate a correspondence between an uplink CE level and a random access configuration; and the obtaining, by the network device, an uplink CE level of the terminal device includes: receiving, by the network device, a random access signal sent by the terminal device; and determining, by the network device, the uplink CE level of the terminal device based on a random access configuration of the random access signal and the correspondence.

With reference to the second aspect, in a possible implementation, the method further includes: sending, by the network device, second configuration information to the terminal device, where the second configuration information is used to indicate a correspondence between a random access configuration and a combination of an uplink CE level and a downlink CE level; and the obtaining, by the network device, an uplink CE level of the terminal device includes: receiving, by the network device, a random access signal sent by the terminal device; and determining, by the network device based on a random access configuration of the random access signal and the correspondence, the uplink CE level and the downlink CE level that are of the terminal device.

With reference to the second aspect, in a possible implementation, the method further includes: sending, by the network device, third configuration information to the terminal device, where the third configuration information is used to indicate the second CE level quality threshold.

With reference to the second aspect, in a possible implementation, the method further includes: sending, by the network device, fourth configuration information to the terminal device, where the fourth configuration information is used to indicate a quality threshold difference, and the second CE level quality threshold is determined based on the first CE level quality threshold and the quality threshold difference.

With reference to the second aspect, in a possible implementation, the uplink CE level of the terminal device is an uplink CE level of a first uplink carrier, and the method further includes: sending, by the network device, indication information to the terminal device, where the indication information is used to: if the uplink CE level of the first uplink carrier is higher than an uplink CE level of a supplementary uplink SUL carrier, indicate to perform uplink transmission by using the SUL carrier, where a frequency of the first uplink carrier is higher than a frequency of the SUL carrier, and a higher uplink CE level indicates a poorer coverage capability corresponding to the uplink CE level, or the indication information is used to: if the uplink CE level of the first uplink carrier is lower than an uplink CE level of an SUL carrier, indicate to perform uplink transmission by using the SUL carrier, where a frequency of the first uplink carrier is higher than a frequency of the SUL carrier, and a higher uplink CE level indicates a stronger coverage capability corresponding to the uplink CE level.

According to a third aspect, this application provides a communications apparatus. The apparatus has functions of implementing the method according to the first aspect. The functions may be implemented by using hardware, or may be implemented by hardware executing corresponding software. The hardware or the software includes one or more units or modules that are corresponding to the foregoing functions.

According to a fourth aspect, this application provides a communications apparatus. The apparatus has functions of implementing the method according to the second aspect. The functions may be implemented by using hardware, or may be implemented by hardware executing corresponding software. The hardware or the software includes one or more units or modules that are corresponding to the foregoing functions.

According to a fifth aspect, a communications apparatus is provided. The communications apparatus includes a memory, a communications interface, and a processor. The memory is configured to store a computer program or instructions. The processor is coupled to the memory and the communications interface. When the processor executes the computer program or the instructions, the communications apparatus is enabled to perform the method according to the first aspect.

According to a sixth aspect, a communications apparatus is provided. The communications apparatus includes a memory, a communications interface, and a processor. The memory is configured to store a computer program or instructions. The processor is coupled to the memory and the communications interface. When the processor executes the computer program or the instructions, the communications apparatus is enabled to perform the method according to the second aspect.

According to a seventh aspect, a computer program product is provided. The computer program product includes computer program code. When the computer program code is run on a computer, the computer is enabled to perform the method according to the first aspect.

According to an eighth aspect, a computer program product is provided. The computer program product includes computer program code. When the computer program code is run on a computer, the computer is enabled to perform the method according to the second aspect.

According to a ninth aspect, this application provides a chip system. The chip system includes a processor, configured to implement the method according to the first aspect, for example, receive or process data and/or information in the foregoing method. In a possible design, the chip system further includes a memory. The memory is configured to store program instructions and/or data. The chip system may include a chip, or may include a chip and another discrete component.

According to a tenth aspect, this application provides a chip system. The chip system includes a processor, configured to implement the method according to the second aspect, for example, receive or process data and/or information in the foregoing method. In a possible design, the chip system further includes a memory. The memory is configured to store program instructions and/or data. The chip system may include a chip, or may include a chip and another discrete component.

According to an eleventh aspect, this application provides a computer-readable storage medium. The computer-readable storage medium stores a computer program. When the computer program is run, the method according to the first aspect is implemented.

According to a twelfth aspect, this application provides a computer-readable storage medium. The computer-readable storage medium stores a computer program. When the computer program is run, the method according to the second aspect is implemented.

DESCRIPTION OF EMBODIMENTS

Figure 1:
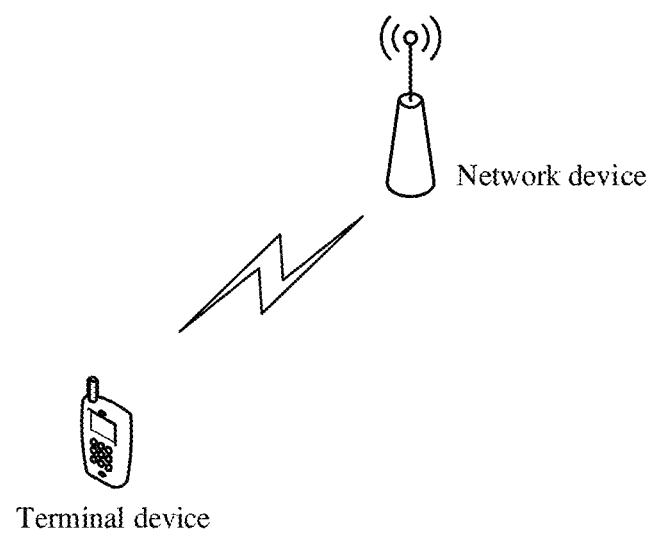
FIG. 1 is a schematic diagram of an application scenario, in accordance with some embodiments.

The following describes technical solutions of this application with reference to the accompanying drawings.

The technical solutions in embodiments of this application may be used in various communications systems, for example, a long term evolution (LTE) system, a 5th generation (5G) system, or a new radio (NR) system.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application.

A network device in the embodiments of this application may be a device configured to communicate with the terminal device. The network device may be an evolved NodeB (eNB or eNodeB) in the LTE system, or may be a radio controller in a cloud radio access network (CRAN) scenario. Alternatively, the network device may be a relay station, an access point, a vehicle-mounted device, a wearable device, a network device in the future 5G network, a network device in the future evolved PLMN, or the like. This is not limited in the embodiments of this application.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that process a service by using a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in the embodiments of this application is not specifically limited in the embodiments of this application, provided that a program that records code for the method provided in the embodiments of this application can be run to perform communication according to the method provided in the embodiments of this application. For example, the execution body of the method provided in the embodiments of this application may be the terminal device, the network device, or a functional module that is in the terminal device or the network device and that can invoke and execute the program.

FIG. 1 is a schematic diagram of a possible application scenario, in accordance with some embodiments. As shown in FIG. 1, the application scenario may include a terminal device and a network device. For specific descriptions of the terminal device and the network device, refer to the foregoing related descriptions. In an example, the terminal device may be a mobile terminal, and the network device may be an access network device. As shown in FIG. 1, the terminal device may access a network through the network device, and the terminal device and the network device may communicate with each other over a radio link. FIG. 1 is not limited to a scenario in which one network device communicates with the terminal device. The application scenario in this embodiment of this application may further include a carrier aggregation scenario, a dual connectivity scenario, a coordinated multipoint transmission/reception scenario, or the like.

Figure 2:
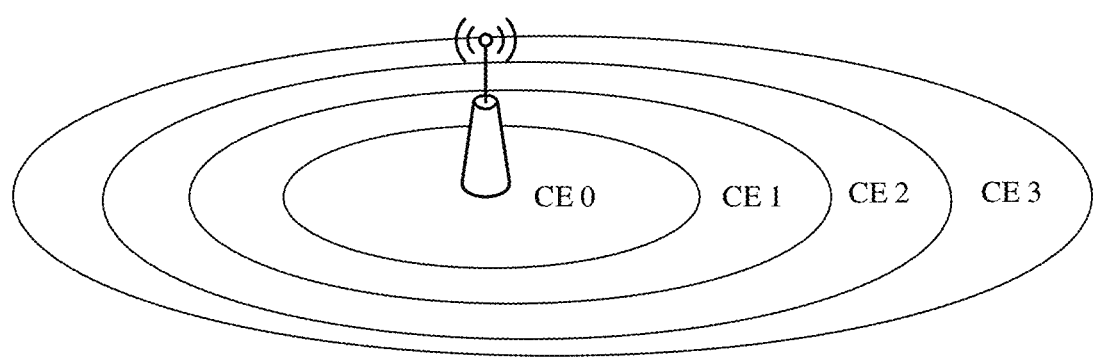
FIG. 2 is a schematic diagram of CE levels, in accordance with some embodiments.

FIG. 2 is a schematic diagram of CE levels (CE level), in accordance with some embodiments. When a CE mechanism is used, a plurality of CE levels may be used to represent coverage statuses or coverage capabilities of a carrier, where the coverage status or the coverage capability of the carrier may be represented by signal quality. As shown in FIG. 2, as an example instead of a limitation, the CE mechanism may include CE levels 0 to 3. The CE level 0 to the CE level 3 sequentially correspond to signal quality in descending order. For example, the CE level 0 corresponds to optimal signal quality, and the CE level 3 corresponds to worst signal quality. It should be understood that there may alternatively be another association relationship between a CE level and signal quality. For example, the CE levels 0 to 3 may sequentially correspond to signal quality in ascending order. In this embodiment of this application, descriptions are provided by using an example in which the CE levels 0 to 3 sequentially correspond to signal quality in descending order. In addition, more or fewer CE levels may be used to indicate the signal coverage capability. This is not limited in this application.

The terminal device may make comparison between actually measured downlink signal quality of a serving cell and a CE level quality threshold. In a possible manner, the CE level quality threshold may be obtained by using a system message broadcast by a network device. The CE level quality threshold may include at least one threshold. For example, for the foregoing four CE levels, there may be three CE level quality thresholds. It is assumed that the three quality thresholds are as follows: a threshold 1=100, a threshold 2=60, and a threshold 3=30. When the measured downlink signal quality is greater than 100, the CE level is the CE level 0. When the downlink signal quality is less than 100 but greater than 60, the CE level is a CE level 1. The rest can be deduced by analogy.

The foregoing different CE levels may correspond to different quantities of repetitions of data transmission and/or different modulation schemes, so as to achieve a balance between a coverage and a capacity. The quantity of repetitions may be a quantity of times of scheduling same data in same resource blocks in consecutive subframes. A receive end may combine received data by using a hybrid automatic repeat request (HARQ), to obtain a combining gain, so as to improve edge coverage performance. The quantity of repetitions may be a maximum quantity of repetitions of data transmission. In this application, the data transmission may include sending data and/or receiving data.

Figure 3:
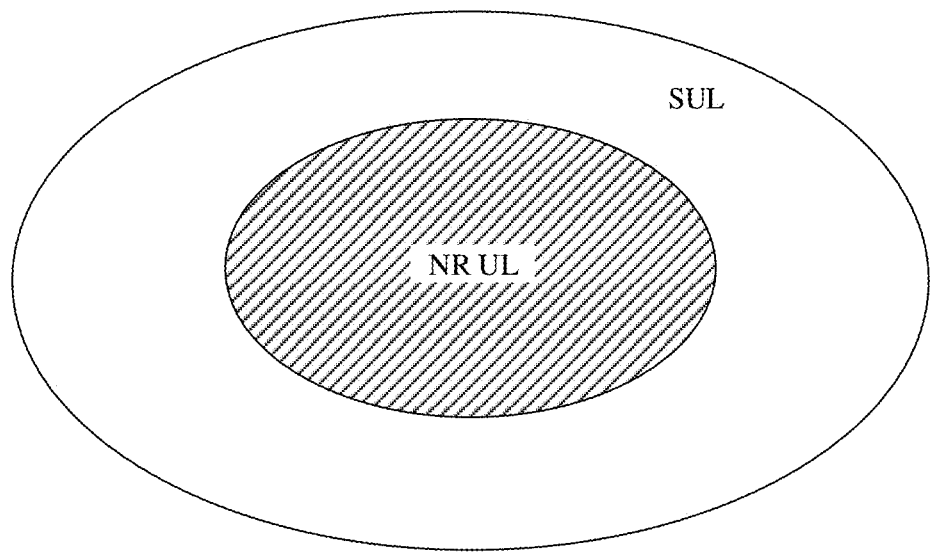
FIG. 3 is a schematic diagram of coverage areas of uplink carriers, in accordance with some embodiments.

In a future communications system, for example, in a 5G system or an NR system, a frequency band of the carrier is extended to a high frequency band. The high frequency band may include a centimeter wave band and a millimeter wave band. For example, the centimeter wave band may refer to a spectrum in a range of 3 gigahertz (GHz) to 20 GHz, and the millimeter wave band usually refers to a spectrum in a range of 30 GHz to 300 GHz. In a high frequency scenario in which an uplink (UL) carrier belongs to the high frequency band, because an uplink transmit power of a terminal device is limited, a coverage area of the uplink carrier may be smaller than a coverage area of a downlink (DL) carrier. In this application, the uplink carrier in the high frequency band may be referred to as an NR UL carrier. In addition, in a new wireless communications system, to keep the coverage area of the uplink carrier consistent with the coverage area of the downlink carrier, a low-frequency supplementary uplink (SUL) carrier is further introduced. A frequency of the SUL carrier is lower than a frequency of the NR UL carrier. Usually, it may be considered that a coverage area of the SUL carrier is relatively consistent with the coverage area of the DL carrier. For example, FIG. 3 is a schematic diagram of coverage areas of uplink carriers, in accordance with some embodiments. The uplink carriers in FIG. 3 include an NR UL carrier and an SUL carrier, and a coverage area of the SUL carrier is usually larger than a coverage area of the NR UL carrier.

Figure 4:
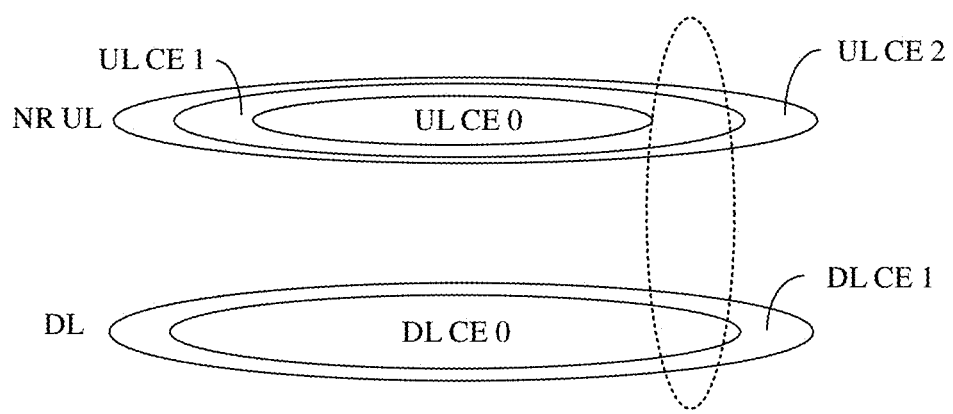
FIG. 4 is a schematic diagram of coverage areas of an uplink carrier and a downlink carrier, in accordance with some embodiments.

In a common CE level determining method, regardless of an uplink carrier or a downlink carrier, a CE level is determined based on downlink signal quality and a CE level quality threshold. In other words, an uplink carrier and a downlink carrier that are of a terminal device use a same CE level determining manner. However, because the coverage area of the NR UL carrier is smaller than the coverage area of the downlink carrier, if the NR UL carrier and the downlink carrier use a same CE level quality threshold to determine the CE level, a real coverage status of the NR UL carrier of the terminal device may not be reflected. For example, FIG. 4 is a schematic diagram of coverage areas of an uplink carrier and a downlink carrier. The uplink carrier in FIG. 4 is an NR UL carrier. A coverage area of the NR UL carrier is smaller than that of the downlink carrier. Therefore, in an area shown by a dashed line in FIG. 4, a CE level of the DL carrier is 0, but an actual coverage status of the NR UL carrier corresponds to a CE level 1. In other words, signal quality of the NR UL carrier in this area is lower than signal quality corresponding to the CE level 0. If data is transmitted on the NR UL carrier based on the CE level 0, transmission quality may deteriorate.

In view of this, an embodiment of this application provides a communication method, to separately determine, based on different CE level quality thresholds, an uplink CE level and a downlink CE level that are of a terminal device, so that signal quality of uplink and downlink carriers can be more accurately indicated by using the CE levels, to improve communication efficiency.

Figure 5:
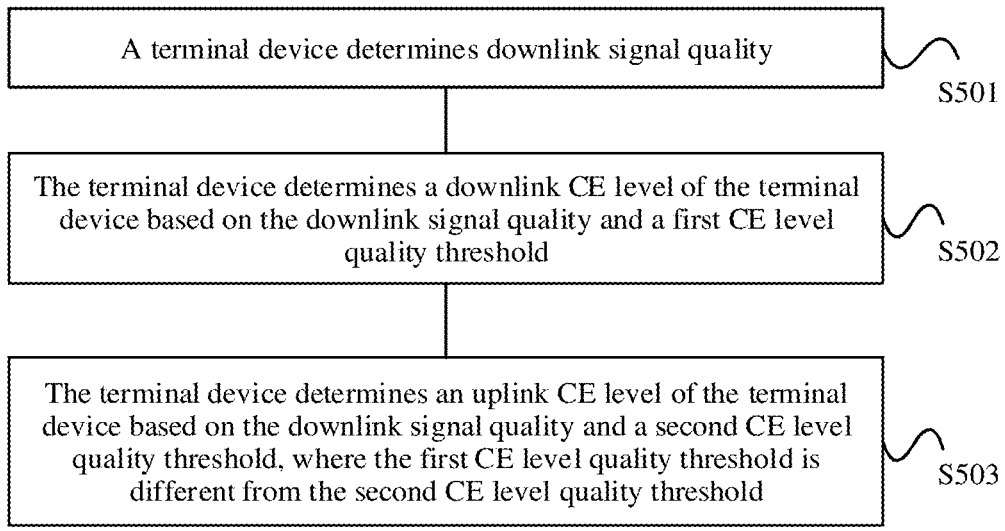
FIG. 5 is a schematic diagram of a communication method, in accordance with some embodiments.

FIG. 5 is a schematic diagram of a communication method, in accordance with some embodiments. The following uses a terminal device and a network device as an example for description. It may be understood that a method implemented by the terminal device may alternatively be implemented by a component (for example, a chip or a circuit) that may be used in the terminal device, and a method implemented by the network device may alternatively be implemented by a component (for example, a chip or a circuit) that may be used in the network device. The method in FIG. 5 includes the following steps.

S501. The terminal device determines downlink signal quality.

Optionally, the downlink signal quality may be obtained by measuring at least one of a downlink synchronization channel, a channel state information reference signal (CSI-RS), a demodulation reference signal (DMRS), a cell-specific reference signal (CRS), a synchronization signal (synchronization signal, SS), a synchronization signal/physical broadcast channel block (synchronization signal/physical broadcast channel block, SS/PBCH Block), or another downlink signal.

Optionally, the downlink signal quality may include at least one of a reference signal received power (RSRP), reference signal received quality (RSRQ), a signal noise ratio (SNR), a signal to interference plus noise ratio (SINR), a reference signal strength indication (RSSI), or other signal quality.

Optionally, the downlink signal quality may be at a cell level, a beam level, an SS/PBCH level, a numerology level, a slicing level, or a bandwidth part (bandwidth part, BWP) level.

Optionally, in the embodiments of this application, a beam may be understood as a spatial resource, and may be a transmit or receive precoding vector having energy transmission directivity. In addition, the transmit or receive precoding vector can be identified by using index information. The index information may correspond to a resource identifier (ID) configured for a terminal. For example, the index information may correspond to an identifier or a resource of a configured CSI-RS, or may correspond to an identifier or a resource of a configured uplink sounding reference signal (SRS). Optionally, the index information may alternatively be index information explicitly or implicitly carried by a signal or a channel that is carried by a beam. The energy transmission directivity may mean that the precoding vector is used to perform precoding processing on a signal that is to be sent, so that the signal obtained after the precoding processing has specific spatial directivity, and the signal obtained after the precoding processing is performed by using the precoding vector is received at a relatively good received power, for example, meets a received demodulation signal-to-noise ratio. The energy transmission directivity may also mean that same signals sent from different spatial locations and received by using the precoding vector at different received powers. Optionally, a same communications apparatus (for example, the terminal device or the network device) may have different precoding vectors, and different devices may also have different precoding vectors, that is, correspond to different beams. For a configuration or a capability of a communications apparatus, one communications apparatus may simultaneously use one or more of a plurality of different precoding vectors, that is, one or more beams may be simultaneously formed.

Optionally, a numerology is a radio configuration of the terminal device during communication. For example, in a long term evolution (LTE) system or even a 5th generation mobile communications system, the numerology may include a subcarrier spacing, a cyclic prefix length, a multiple access manner, a modulation and coding scheme (MCS), a frame structure, radio resource control (RRC), and the like.

S502. The terminal device determines a downlink CE level of the terminal device based on the downlink signal quality and a first CE level quality threshold.

Optionally, the downlink CE level of the terminal device may be a CE level of a downlink carrier. For example, the downlink CE level of the terminal device may be a CE level of an NR DL carrier.

Optionally, the first CE level quality threshold may include at least one threshold. The terminal device may determine the downlink CE level of the terminal device based on a result of comparison between the downlink signal quality and the first CE level quality threshold. For example, it is assumed that four downlink CE levels are used to indicate coverage statuses of the downlink carrier, which are a DL CE level 0 to a DL CE level 3. For the four downlink CE levels, three first CE level quality thresholds may be configured. For example, the three thresholds are: a DL threshold 1=100, a DL threshold 2=60, and a DL threshold 3=30. When the measured downlink signal quality is greater than 100, the downlink CE level is the DL CE level 0. When the downlink signal quality is less than 100 but greater than 60, the downlink CE level is a DL CE level 1. The rest can be deduced by analogy.

Optionally, the first CE level quality threshold may be configured by a network side for the terminal device. For example, the network device may send the first CE level quality threshold to the terminal device, and correspondingly, the terminal device receives the first CE level quality threshold. In this embodiment of this application, the first CE level quality threshold may be carried in a system message or another type of message.

Optionally, an uplink CE level quality threshold or a downlink CE level quality threshold in this embodiment of this application may be represented based on at least one of an RSRP threshold, an RSRQ threshold, an SNR threshold, an SINR threshold, an RSSI threshold, or another quality threshold.

S503. The terminal device determines an uplink CE level of the terminal device based on the downlink signal quality and a second CE level quality threshold, where the first CE level quality threshold is different from the second CE level quality threshold.

Optionally, in this embodiment of this application, the uplink CE level may be a CE level of an uplink carrier. For example, the uplink CE level may be a CE level of an NR UL carrier, or may be a CE level of an SUL carrier. In an example, the NR UL carrier, the SUL carrier, and the downlink carrier each may determine a CE level by using a different CE level quality threshold. Alternatively, in another example, the NR UL carrier and the downlink carrier each may determine a CE level by using a different CE level quality threshold, and the SUL carrier may determine a CE level by using a CE level quality threshold that is the same as a CE level quality threshold used by the downlink carrier.

Optionally, the second CE level quality threshold may include at least one threshold. That the first CE level quality threshold is different from the second CE level quality threshold may mean that at least one threshold in the first CE level quality threshold is different from at least one threshold in the second CE level quality threshold. For example, a part of the threshold in the first CE level quality threshold is different from a part of the threshold in the second CE level quality threshold. Alternatively, each threshold in the first CE level quality threshold is different from each threshold in the second CE level quality threshold.

Optionally, the second CE level quality threshold may be configured by the network side. Alternatively, the network side may indicate a quality threshold difference between the first CE level quality threshold and the second CE level quality threshold to the terminal device, and the terminal device may determine the second CE level quality threshold based on the first CE level quality threshold and the quality threshold difference configured by the network side. Alternatively, the network side may indicate a quality threshold difference to the terminal device, and the terminal device may determine the first CE level quality threshold based on the second CE level quality threshold and the quality threshold difference configured by the network side. For example, before receiving the quality threshold difference, the terminal device may receive the second CE level quality threshold from the network side.

In an example, the terminal device receives third configuration information from the network device, and correspondingly, the network device sends the third configuration information to the terminal device, where the third configuration information is used to indicate the second CE level quality threshold.

In another example, the terminal device receives fourth configuration information from the network device, and correspondingly, the network device sends the fourth configuration information to the terminal device, where the fourth configuration information is used to indicate the quality threshold difference. The terminal device determines the second CE level quality threshold based on the first CE level quality threshold and the quality threshold difference.

In this embodiment of this application, the second CE level quality threshold used to determine the uplink CE level is introduced. The terminal device may determine the uplink CE level based on the second CE level quality threshold, so that the CE level can be more accurately determined, to improve communication efficiency.

Further, the quality threshold difference used to determine the second CE level quality threshold is introduced. The terminal device may determine the second CE level quality threshold based on the first CE level quality threshold and the quality threshold difference, so that the network device does not need to send the second CE level quality threshold, and signaling overheads can be reduced.

Optionally, the first CE level quality threshold and the second CE level quality threshold each include M quality thresholds. M is an integer greater than or equal to 2. In this case, there may be one quality threshold difference, and the M quality thresholds in the first CE level quality threshold are separately added to the one quality threshold difference, to obtain the M quality thresholds in the second CE level quality threshold. For example, it is assumed that the network device indicates, to the terminal device, that the first CE level quality threshold includes: a DL threshold 1=100, a DL threshold 2=60, and a DL threshold 3=30, and indicates that the quality threshold difference is 10. The terminal device may determine that the second CE level quality threshold includes: a UL threshold 1=110, a UL threshold 2=70, and a UL threshold 3=40.

Alternatively, there may be M quality threshold differences corresponding to the M thresholds, where the M quality threshold differences may be different. The M quality thresholds in the first CE level quality threshold are separately added to the corresponding quality threshold differences, to obtain the M quality thresholds in the second CE level quality threshold. For example, it is assumed that the network device indicates, to the terminal device, that the first CE level quality threshold includes: a DL threshold 1=100, a DL threshold 2=60, and a DL threshold 3=30, and indicates that the quality threshold differences are 5, 10, and 15. The terminal device may determine that the second CE level quality threshold includes: a UL threshold 1=105, a UL threshold 2=70, and a UL threshold 3=45.

Optionally, a quantity of thresholds included in the first CE level quality threshold may be the same as or different from a quantity of thresholds included in the second CE level quality threshold.

In an example, it is assumed that both the uplink CE level and downlink CE level include four levels, which are a UL CE level 0 to a UL CE level 3 and a DL CE level 0 to a DL CE level 3. Correspondingly, the first CE level quality threshold may include three thresholds. It is assumed that the three thresholds are: a DL threshold 1=100, a DL threshold 2=60, and a DL threshold 3=30. The second CE level quality threshold may also include three thresholds. It is assumed that the three thresholds are: a UL threshold 1=110, a UL threshold 2=70, and a UL threshold 3=40. If the measured downlink signal quality is greater than 110, the uplink CE level of the terminal device is 0, and the downlink CE level of the terminal device is 0. If the downlink signal quality is greater than 100 and less than 110, the uplink CE level of the terminal device is 1, and the downlink CE level of the terminal device is 0. The rest can be deduced by analogy.

Further, in this embodiment of this application, because mechanisms of determining the uplink CE level and the downlink CE level are different, the terminal device may separately indicate the uplink CE level and the downlink CE level to the network side. The terminal device may explicitly or implicitly indicate the uplink CE level and/or the downlink CE level. For example, the terminal device may indicate the uplink CE level and/or the downlink CE level to the network side based on a random access configuration. Alternatively, the terminal device may send, to the network side, information indicating the uplink CE level and/or the downlink CE level. For example, in a random access process, the terminal device may send, to the network side by using a message 1 (MSG 1) or a message 3 (MSG 3), the information indicating the uplink CE level and/or the downlink CE level. Alternatively, after random access is completed, the information indicating the uplink CE level and/or the downlink CE level may be sent by using another message.

In a possible manner, to improve service transmission performance of the terminal device, the terminal device may notify the network side of CE levels of the terminal device, so that the network side determines corresponding quantities of repetitions of data transmission based on the CE levels of the terminal device. The CE levels include the uplink CE level and the downlink CE level. Optionally, the terminal device may indicate the CE levels to the network side based on the random access configuration. Different CE levels may correspond to different random access configurations. The random access configuration may include, for example, a random access resource and/or information about a random access preamble, or may include other configuration information used for random access. The random access resource may be a time-frequency resource used to send the preamble, for example, a physical random access channel (PRACH) resource. The information about the random access preamble may be configuration information of the random access preamble. For example, the information about the random access preamble may include but is not limited to at least one of the following: indication information of the time-frequency resource (for example, the PRACH resource) used to send the preamble; a preamble index, used to allocate a preamble resource; or indication information of a root sequence, used to generate the preamble. Alternatively, the random access configuration may include at least one of the following: indication information of a maximum quantity of preamble transmissions; indication information of a receive window for a response of a message 1 (message 1, MSG 1), where the MSG 1 usually refers to a preamble; indication information of a power ramping step of a preamble; indication information of a subcarrier spacing of a preamble; or indication information of a scaling factor of a backoff indication, used to determine a delay time when random access is not completed and before the terminal device initiates preamble retransmission. For example, it is assumed that the terminal device determines, based on a backoff indication of a network, that a delay time is 200 milliseconds (ms). The terminal device randomly selects a value A from 0 to 200 ms×a scaling factor, and the delay time of the terminal device is A.

The network device may determine, based on a random access configuration of a received random access signal and a correspondence between a random access configuration and a CE level, the uplink CE level and/or the downlink CE level of the terminal device.

In addition, in a scenario including the SUL carrier, if the terminal device supports the SUL carrier and performs service transmission on SUL, the terminal device may also indicate, to the network side, a CE level corresponding to the SUL carrier. Optionally, the terminal device may explicitly or implicitly indicate the CE level corresponding to the SUL carrier. For example, in a protocol, an SUL CE level may be defined as the same as the downlink CE level. In this case, the terminal device considers by default that the SUL carrier and the downlink carrier have a same CE level. In this case, the CE level corresponding to the SUL carrier may not need to be separately indicated. Alternatively, the SUL carrier may use a CE level determining mechanism different from that used by the NR UL carrier or the downlink carrier. For example, it is assumed that the DL carrier corresponds to the first CE level quality threshold, the NR UL carrier corresponds to the second CE level quality threshold, and the SUL carrier corresponds to a third CE level quality threshold. An uplink CE level of the SUL carrier may be determined based on the downlink signal quality and the third CE level quality threshold. The third CE level quality threshold may be sent by the network device, or may be determined by the terminal device based on the first CE level quality threshold and/or the second CE level quality threshold and the quality threshold difference.

In a manner, different uplink CE levels may correspond to different random access configurations. The terminal device sends a random access signal on a random access configuration corresponding to the uplink CE level of the terminal device, so that the network device determines the uplink CE level of the terminal device based on the random access signal. The terminal device may send the downlink CE level of the terminal device to the network device after random access, so that the network device determines the downlink CE level of the terminal device. Alternatively, the terminal device may send a random access signal based on a random access configuration corresponding to the downlink CE level, and the terminal device sends the uplink CE level of the terminal device to the network device after random access. In this manner, fewer types of random access configurations are introduced, so that signaling can be reduced and configurations can be simplified.

In another manner, different combinations of uplink CE levels and downlink CE levels may correspond to different random access configurations, and the terminal device may select, based on a combination of an uplink CE level and a downlink CE level, a corresponding random access configuration to send a random access signal. For example, the network side may configure: {DL CE 0, NR UL CE 0}, {DL CE 0, NR UL CE 1}, . . . , {DL CE 0, NR UL CE n−1}, {DL CE 1, NR UL CE 0}, . . . , and {DL CE m−1, NR UL n−1}, which correspond to different random access configurations. m and n are integers greater than or equal to 2. The network device may send the foregoing correspondences to the terminal device. For example, if the terminal device determines that the NR UL CE level is 1 and the DL CE level is 0, the terminal device may select a random access configuration corresponding to {DL CE 0, NR UL CE 1} to send a random access signal. Therefore, the network device may determine, based on the random access configuration of the received random access signal, that the DL CE level of the terminal device is 0, and the NR UL CE level is 1.

For example, the network device sends first configuration information to the terminal device. Correspondingly, the terminal device receives the first configuration information from the network device. Correspondingly, the network device sends the first configuration information to the terminal device, where the first configuration information is used to indicate a correspondence between an uplink CE level and a random access configuration. The terminal device determines, based on the correspondence, a first random access configuration corresponding to the uplink CE level of the terminal device. The terminal device sends a random access signal based on the first random access configuration. Correspondingly, the network device may receive the random access signal, and determine the uplink CE level of the terminal device based on the random access configuration of the random access signal and the correspondence.

In this embodiment of this application, the terminal device may report the uplink CE level to the network device by using the random access configuration of the random access signal, and no additional information needs to be sent, so that signaling overheads can be reduced.

For another example, the network device sends second configuration information to the terminal device. Correspondingly, the terminal device receives the second configuration information from the network device, where the second configuration information is used to indicate a correspondence between a random access configuration and a combination of an uplink CE level and a downlink CE level. The terminal device determines, based on the correspondence, a second random access configuration corresponding to a combination of the uplink CE level and the downlink CE level that are of the terminal device. The terminal device sends a random access signal based on the second random access configuration. Correspondingly, the network device may receive the random access signal, and determine, based on the random access configuration of the random access signal and the correspondence, the uplink CE level and the downlink CE level that are of the terminal device.

In this embodiment of this application, the terminal device may report the uplink CE level and the downlink CE level to the network device by using the random access configuration of the random access signal, and no additional information needs to be sent, so that signaling overheads can be reduced.

In a specific example, it is assumed that the terminal device performs uplink transmission by using the NR UL carrier. The CE level of the NR UL carrier is represented by an NR CE level. The CE level of the SUL carrier is represented by an SUL CE level. The CE level of the downlink carrier is represented by a DL CE level. In this case, a process in which the terminal device determines the CE level and indicates the CE levels to the network side may be shown as follows.

S01. The terminal device determines an NR UL CE level quality threshold of the terminal device.

For example, the terminal device may receive the NR UL CE level quality threshold sent by the network device, and correspondingly, the network device sends the NR UL CE level quality threshold.

For another example, the terminal device may receive an NR DL CE level quality threshold and a quality threshold difference that are sent by the network device, and the terminal device determines the NR UL CE level quality threshold based on the NR DL CE level quality threshold and the quality threshold difference.

S02. The terminal device receives a correspondence that is between an NR UL CE level and a random access configuration and that is sent by the network device, and correspondingly, the network device sends the correspondence to the terminal device.

For example, it is assumed that, based on the correspondence, random access preambles corresponding to NR UL CE levels 0, 1, 2, and 3 are preambles 10, 11, 12, and 14 respectively. Quantities of repetitions corresponding to the CE levels 0, 1, 2, and 3 are 1, 5, 10, and 20 respectively. Regardless of an uplink carrier and a downlink carrier, a same CE level corresponds to a same quantity of repetitions.

S03. The terminal device determines the NR UL CE level and the DL CE level.

For example, the NR UL CE level and the DL CE level may be determined based on a result of comparison between the downlink signal quality and different quality thresholds. In an example, it may be assumed that the NR UL CE level is 1, and the DL CE level is 0.

S04. The terminal device determines a random access configuration corresponding to the NR UL CE level of the terminal device, and sends a preamble based on the random access configuration. Correspondingly, the network device receives the preamble.

For example, the NR UL CE level 1 corresponds to the preamble 11, and the terminal device may send the preamble 11 to the network device. To avoid that the network side cannot correctly receive the preamble 11, the terminal device may repeatedly send the preamble 11 for five times based on the quantity 5 of repetitions corresponding to the NR UL CE level 1.

Optionally, in this application, the preamble may also be referred to as an MSG 1.

S05. The terminal device receives a response message sent by the network device, and correspondingly, the network device sends the response message.

For example, if the network device correctly receives the preamble 11, the network device may determine, based on the correspondence between an NR UL CE level and a random access configuration, that the NR UL CE level of the terminal device is 1.

Because the DL CE level of the terminal device is not determined, the network device may temporarily send a downlink signal based on the NR UL CE level. In other words, the network device repeatedly sends the response message to the terminal device for five times. For the terminal device, the terminal device has learned that the DL CE level of the terminal device is 0. Therefore, the terminal device may receive the response message only once based on the DL CE level 0. The response message may also be usually referred to as a message 2 (message 2, MSG 2).

At a same location, NR UL signal quality is usually lower than DL signal quality. Lower signal quality may indicate a lower CE level and a higher quantity of repeat transmissions. Therefore, when only the NR UL CE level is learned, if the network side determines quantities of uplink and downlink repeat transmissions based on the NR UL CE level, uplink and downlink transmission performance of the terminal device can be ensured.

It should be noted that, in some examples, a lower CE level indicates a stronger coverage capability or better signal quality corresponding to the CE level. For example, the CE level 0 is lower than the CE level 1, but signal quality corresponding to the CE level 0 is better than signal quality corresponding to the CE level 1. Alternatively, in some other examples, a higher CE level indicates a stronger coverage capability or better signal quality corresponding to the CE level.

S06. The terminal device sends indication information to the network device, to indicate the DL CE level of the terminal device.

For example, the DL CE level of the terminal device is indicated as 0.

For example, after receiving the response message, the terminal device may indicate the DL CE level of the terminal device to the network side in a message 3 (MSG 3), to avoid a waste of resources that is caused when the network side still sends downlink signaling or data based on the NR UL CE level. The MSG 3 may be RRC signaling or layer 2 signaling, for example, a medium access control (MAC) control element (CE).

Figure 6:
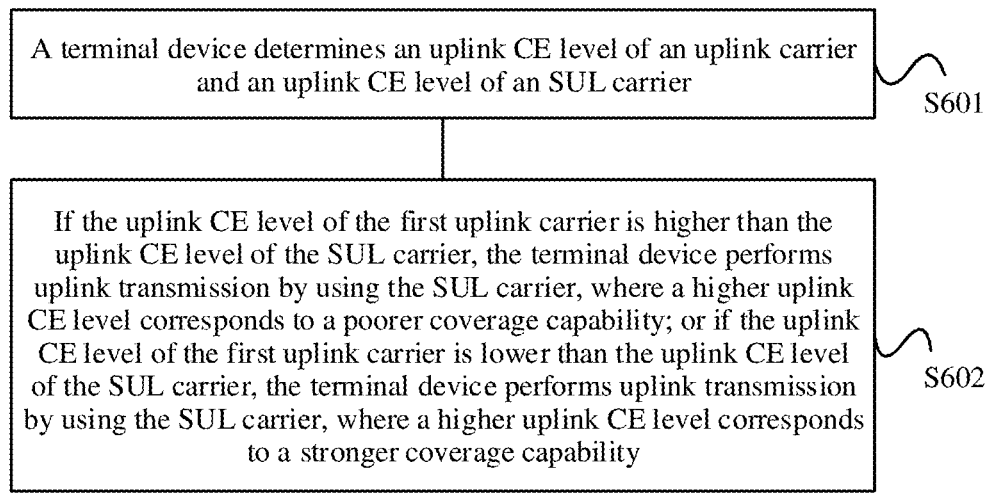
FIG. 6 is a schematic diagram of a communication method, in accordance with some embodiments.

FIG. 6 is a flowchart of still another communication method, in accordance with some embodiments. The method may be performed by a terminal device, or may be performed by a chip of a terminal device. The following uses the terminal device as an example for description. As shown in FIG. 6, the method includes the following steps.

S601. The terminal device determines an uplink CE level of a first uplink carrier and an uplink CE level of an SUL carrier, where a frequency of the first uplink carrier is higher than a frequency of the SUL carrier.

The first uplink carrier may be an NR UL carrier. Optionally, for a specific manner in which the terminal device determines the CE levels of the first uplink carrier and the SUL carrier, refer to the manner described above, or the CE levels may be determined in another manner. Details are not described herein again.

S602. If the uplink CE level of the first uplink carrier is higher than the uplink CE level of the SUL carrier, the terminal device performs uplink transmission by using the SUL carrier, where a higher uplink CE level corresponds to a poorer coverage capability. Alternatively, if the uplink CE level of the first uplink carrier is lower than the uplink CE level of the SUL carrier, the terminal device performs uplink transmission by using the SUL carrier, where a higher uplink CE level corresponds to a stronger coverage capability.

Figure 7:
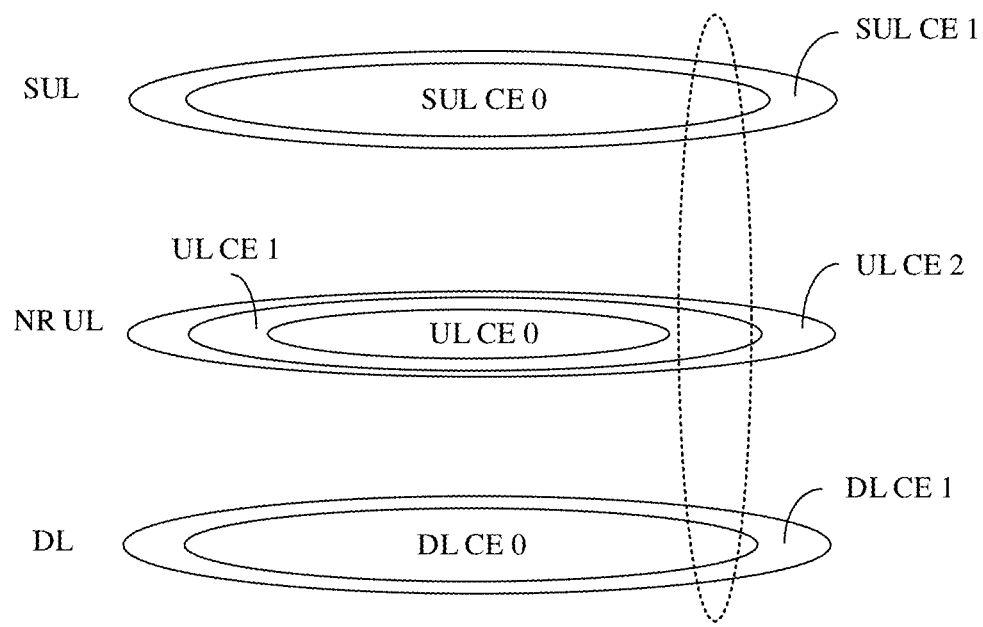
FIG. 7 is a schematic diagram of coverage areas of an uplink carrier and a downlink carrier, in accordance with some embodiments.

For example, FIG. 7 is a schematic diagram of coverage areas of an NR UL carrier and an SUL carrier that are supported by a cell. As shown in FIG. 7, in an area shown by a dashed line, a coverage capability corresponding to a CE level of the NR UL carrier is poorer than a coverage capability corresponding to a CE level of the SUL carrier. If the terminal device supports the NR UL carrier and the SUL carrier, the terminal device may select to perform uplink transmission on the SUL carrier. It should be noted that, in some examples, a lower CE level may indicate better signal quality corresponding to the CE level. For example, when the terminal device moves to the area shown by the dashed line in FIG. 7, the SUL CE level is 0, the NR UL CE level is 1, the CE level of the SUL carrier is less than the CE level of the NR UL carrier, but the coverage capability corresponding to the SUL carrier is stronger than the coverage capability of the NR UL carrier. Alternatively, in some other examples, a higher CE level indicates a stronger coverage capability or better signal quality corresponding to the CE level.

When the coverage capability corresponding to the CE level is relatively strong, a quantity of repetitions of data retransmission is also relatively small. Additional data retransmission not only reduces a data transmission rate of the terminal device, but also causes more energy consumption and more resource consumption of the terminal device. Therefore, if the coverage capability corresponding to the CE level of the first uplink carrier is poorer than the coverage capability corresponding to the CE level of the SUL carrier, the terminal device may transmit data by using the SUL carrier, to reduce power consumption and resource consumption of the terminal device.

In this embodiment of this application, when the CE level of the first uplink carrier of the terminal device is different from the CE level of the SUL carrier, the terminal device may select the SUL carrier with a relatively strong coverage capability corresponding to the CE level, to transmit data, so as to reduce unnecessary signaling and data repetitions, reduce air interface overheads, and reduce power consumption of the terminal device.

Optionally, the terminal device may determine, by itself, whether to perform uplink transmission by using the SUL carrier, or the terminal device may determine, based on indication information of a network device, whether to perform uplink transmission by using the SUL carrier.

In an example, the terminal device may receive the indication information from the network device. Correspondingly, the network device sends the indication information. The indication information is used to: if the uplink CE level of the uplink carrier is higher than the uplink CE level of the SUL carrier, indicate the terminal device to perform uplink transmission by using the SUL carrier, where a higher uplink CE level indicates a poorer coverage capability corresponding to the uplink CE level; or the indication information may be used to: if the uplink CE level of the uplink carrier is lower than the uplink CE level of the SUL carrier, indicate the terminal device to perform uplink transmission by using the SUL carrier, where a higher uplink CE level indicates a stronger coverage capability corresponding to the uplink CE level.

In a specific example, it is assumed that the terminal device supports the SUL carrier and the NR UL carrier, and a process in which the terminal device rolls back to the SUL carrier may be described as follows. This example is described by using an example in which a higher CE level corresponds to a poorer coverage capability. However, a person skilled in the art can understand that this example may alternatively be used in a scenario in which a higher CE level corresponds to a stronger coverage capability.

S11. The terminal device measures downlink signal quality at a current location, and determines an NR UL CE level and an SUL CE level of the terminal device.

For example, if the terminal device moves to the area shown by the dashed line in FIG. 7, the terminal device may determine, based on the measured downlink signal quality, that the NR UL CE level is 1, a DL CE level is 0, and the SUL CE level is 0.

S12. When finding that the NR UL CE level is higher than the SUL CE level, the terminal device rolls back to the SUL carrier to perform uplink transmission.

For example, if the terminal device moves to the area shown by the dashed line in FIG. 7, the NR UL CE level is 1, and the SUL CE level is 0. In this case, the terminal device may perform transmission by using the SUL carrier.

Optionally, the terminal device may independently determine to roll back to the SUL carrier to perform transmission, or the terminal device may receive indication information sent by the network device, where the indication information is used to indicate the terminal device to roll back to the SUL carrier to perform uplink transmission when the terminal device finds that the NR UL CE level is higher than the SUL CE level.

The indication information may be represented by using one or more bits. For example, when the bit is set to 1, it indicates that the terminal device rolls back to the SUL carrier to perform uplink transmission. When the bit is set to 0, it indicates that the terminal device does not roll back to the SUL carrier to perform transmission.

Alternatively, in another example, when the network device determines that the NR UL CE level of the terminal device is higher than the SUL CE level, the network device may indicate the terminal device to roll back to the SUL carrier to perform uplink transmission. Further, the network device may send SUL configuration information to the terminal device, where the SUL configuration information may include a contention-free random access configuration on the SUL carrier, so that the terminal device quickly rolls back to the SUL carrier. Alternatively, the SUL configuration information may include a contention-based random access configuration. Optionally, the network device may compare, by itself, the NR UL CE level and the SUL CE level. Alternatively, the network device may receive level indication information sent by the terminal device, where the level indication information is used to indicate that the NR UL CE level of the terminal device is higher than the SUL CE level. In this case, the terminal device may not need to report the SUL CE level to the network device.

In this embodiment of this application, when the coverage capability corresponding to the CE level is relatively strong, a quantity of repetitions of data transmission is also relatively small. Additional data retransmission not only reduces a data transmission rate of the terminal device, but also causes more energy consumption and more resource consumption of the terminal device. Therefore, if the coverage capability corresponding to the NR UL CE level is poorer than the coverage capability corresponding to the SUL CE level, the terminal device may transmit data by using the SUL carrier, to reduce power consumption and resource consumption of the terminal device.

The foregoing describes the communication methods in the embodiments of this application with reference to FIG. 1 to FIG. 7. The following describes apparatuses in the embodiments of this application with reference to FIG. 8 to FIG. 10.

Figure 8:
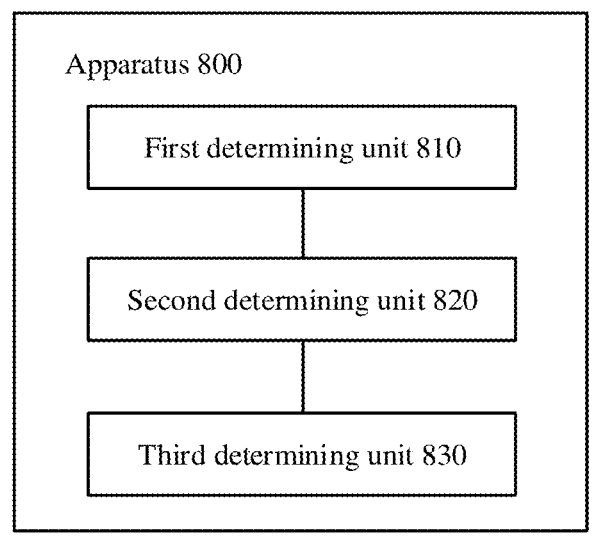
FIG. 8 is a schematic diagram of an apparatus, in accordance with some embodiments.

FIG. 8 is a schematic block diagram of a communications apparatus 800, in accordance with some embodiments. The communications apparatus 800 may be a terminal device, or may be a component (for example, a chip or a circuit) that may be used in a terminal device, and can perform the steps performed by the terminal device in the method embodiments of this application. To avoid repetition, details are not described herein again. In a possible manner, the apparatus 800 may include a first determining unit 810, a second determining unit 820, and a third determining unit 830.

The first determining unit 810 is configured to determine downlink signal quality.

The second determining unit 820 is configured to determine a downlink CE level of the terminal device based on the downlink signal quality and a first CE level quality threshold.

The third determining unit 830 is configured to determine an uplink CE level of the terminal device based on the downlink signal quality and a second CE level quality threshold, where the first CE level quality threshold is different from the second CE level quality threshold.

Figure 9:
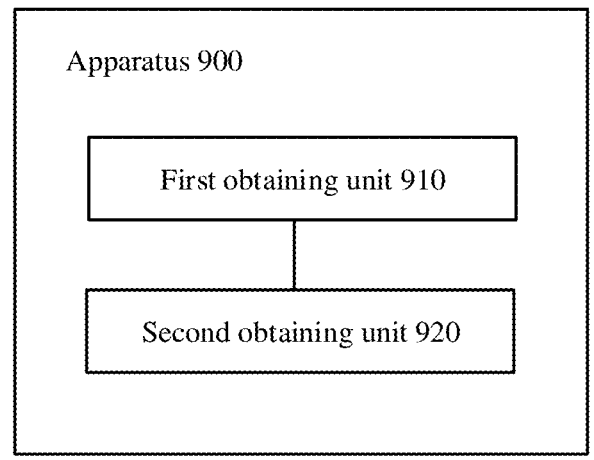
FIG. 9 is a schematic diagram of another apparatus, in accordance with some embodiments.

FIG. 9 is a schematic block diagram of a communications apparatus 900, in accordance with some embodiments. The apparatus 900 may be a network device, or may be a component (for example, a chip or a circuit) used in a network device, and can perform the steps performed by the network device in the method embodiments of this application. To avoid repetition, details are not described herein again. In a possible manner, the apparatus 900 may include a first obtaining unit 910 and a second obtaining unit 920.

The first obtaining unit 910 is configured to obtain a downlink CE level of a terminal device, where the downlink CE level of the terminal device is determined based on downlink signal quality and a first CE level quality threshold.

The second obtaining unit 920 is configured to obtain an uplink CE level of the terminal device, where the uplink CE level of the terminal device is determined based on the downlink signal quality and a second CE level quality threshold, and the first CE level quality threshold is different from the second CE level quality threshold.

It may be understood that the units or modules in the communications apparatus 800 or the communications apparatus 900 may be disposed separately, or may be integrated together. The foregoing units or modules may alternatively be referred to as components or circuits.

Figure 10:
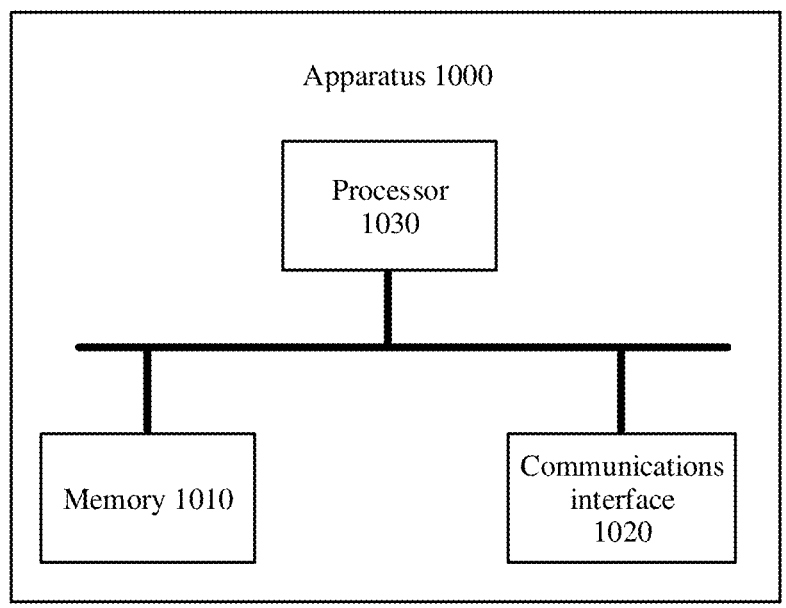
FIG. 10 is a schematic diagram of an apparatus, in accordance with some embodiments.

FIG. 10 is a schematic block diagram of a communications apparatus 1000, in accordance with some embodiments. It should be understood that the apparatus 1000 may be a terminal device, or may be a component (for example, a chip or a circuit) that may be used in a terminal device, and can implement the steps performed by the terminal device in the method embodiments of this application. Alternatively, the apparatus 1000 may be a network device, or may be a component (for example, a chip or a circuit) that may be used in a network device, and can perform the steps performed by the network device in the method embodiments of this application. To avoid repetition, details are not described herein again. In a possible manner, the apparatus 1000 may include:

- one or more memories 1010, configured to store a program or code; and
- one or more processors 1030, configured to execute a program or code in the memories 1010. When the program is executed, if the apparatus 1000 performs the steps corresponding to the terminal device in the method embodiments, the processors 1030 may be configured to: determine downlink signal quality; determine a downlink CE level of a terminal device based on the downlink signal quality and a first CE level quality threshold; and determine an uplink CE level of the terminal device based on the downlink signal quality and a second CE level quality threshold, where the first CE level quality threshold is different from the second CE level quality threshold.

Alternatively, if the apparatus 1000 performs the steps corresponding to the network device in the method embodiments, the processors 1030 may alternatively be configured to: obtain a downlink CE level of a terminal device, where the downlink CE level of the terminal device is determined based on downlink signal quality and a first CE level quality threshold; and obtain an uplink CE level of the terminal device, where the uplink CE level of the terminal device is determined based on the downlink signal quality and a second CE level quality threshold, and the first CE level quality threshold is different from the second CE level quality threshold.

Optionally, the communications apparatus 1000 may further include one or more communications interfaces 1020, configured to communicate with another device. The communications interfaces 1020 may be transceivers. The transceivers may be referred to as transceiver units, transceivers, transceiver circuits, or the like, and are configured to implement sending and receiving functions of the communications apparatus.

For example, if the apparatus 1000 performs the steps corresponding to the terminal device in the method embodiments, the apparatus 1000 may receive first configuration information, second configuration information, third configuration information, and/or fourth configuration information from the network device through the communications interfaces 1020, or receive indication information from the network device through the communications interfaces 1020, or send a random access signal to the network device through the communications interfaces 1020.

For another example, if the apparatus 1000 performs the steps corresponding to the network device in the method embodiments, the apparatus 1000 may send first configuration information, second configuration information, third configuration information, and/or fourth configuration information to the terminal device through the communications interfaces 1020, or send indication information to the terminal device through the communications interfaces 1020, or receive a random access signal from the network device through the communications interfaces 1020.

It may be understood that the memories 1010 may be further configured to store data. The processors, the transceivers, and the memories may be disposed separately, or may be integrated together.

Optionally, the processors 1030 may also be referred to as processing units, and may implement a specific control function. The processors 1030 may be general-purpose processors, dedicated processors, or the like. For example, the processors 1030 may be baseband processors or central processing units. The baseband processors may be configured to process a communications protocol and communications data. The central processing units may be configured to: control a communications apparatus (for example, a base station, a baseband chip, a DU, or a CU), execute a software program, and process data of the software program.

In a possible design, the processors 1030 may alternatively store instructions, and the instructions may be run by the processors, so that the communications apparatus 1000 performs the steps corresponding to the terminal device or the network device in the foregoing method embodiments.

In another possible design, the communications apparatus 1000 may include a circuit. The circuit may implement a sending, receiving, or communication function in the foregoing method embodiments.

The processors and the transceivers described in this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processors and the transceivers may alternatively be manufactured by using various 1C technologies, for example, a complementary metal oxide semiconductor (CMOS), an N-channel metal oxide semiconductor (NMOS), a P-channel metal oxide semiconductor (PMOS), a bipolar junction transistor (BJT), a bipolar CMOS (BiCMOS), silicon germanium (SiGe), and gallium arsenide (GaAs).

In the descriptions of the foregoing embodiments, the communications apparatus is described by using the network device or the terminal device as an example. However, a scope of the communications apparatus described in this application is not limited to the network device or the terminal device, and a structure of the communications apparatus may not be limited by FIG. 8 to FIG. 10. The communications apparatus may be an independent device or may be a part of a relatively large device. For example, the device may be: (1) an independent integrated circuit IC, or a chip, or a chip system, or a subsystem; (2) a set of one or more ICs, where optionally, the IC set may alternatively include a storage component configured to store data and/or instructions; (3) an ASIC, such as a modem (MSM); (4) a module that can be embedded in another device; or (5) a receiver, a terminal, a cellular phone, a wireless device, a handheld device, a mobile unit, a network device, or the like.

It may be understood that in this application, the terminal device and/or the network device may perform some or all steps in the foregoing embodiments. These steps or operations are merely examples. In the embodiments of this application, other operations or variations of various operations may further be performed. In addition, the steps may be performed in different sequences presented in the foregoing embodiments, and not all operations in the foregoing embodiments need to be performed.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. For example, when software is used to implement the embodiments, all or some of the embodiments may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   determining downlink signal quality;
   determining a first downlink coverage enhancement level of a terminal device based on the downlink signal quality and a first coverage enhancement level quality threshold; and
   determining a first uplink coverage enhancement level of the terminal device based on the downlink signal quality and a second coverage enhancement level quality threshold, wherein the first coverage enhancement level quality threshold is different from the second coverage enhancement level quality threshold, and wherein the first coverage enhancement level quality threshold and the second coverage enhancement level quality threshold are configured to keep the coverage area of a downlink carrier based on the first coverage enhancement level quality threshold consistent with the coverage area of an uplink carrier based on the second coverage enhancement level quality threshold.

2. The method according to claim 1, wherein the method further comprises: receiving first configuration information from a network device, wherein the first configuration information is used to indicate a correspondence between a second uplink coverage enhancement level and a first random access configuration;
   determining, based on the correspondence, the first random access configuration corresponds to the first uplink coverage enhancement level of the terminal device; and
   sending a first random access signal based on the first random access configuration.

3. The method according to claim 2, wherein the method further comprises: receiving second configuration information from a network device, wherein the second configuration information is used to indicate a correspondence between a second random access configuration and a combination of the second uplink coverage enhancement level and a second downlink coverage enhancement level;
   determining, based on the correspondence, the second random access configuration corresponds to a combination of the second uplink coverage enhancement level and the second downlink coverage enhancement level that are of the terminal device; and
   sending a second random access signal based on the second random access configuration.

4. The method according to claim 3, wherein the method further comprises:
   receiving third configuration information from the network device, wherein the third configuration information is used to indicate the second coverage enhancement level quality threshold.

5. The method according to claim 4, wherein the method further comprises:
   receiving fourth configuration information from the network device, wherein the fourth configuration information is used to indicate a quality threshold difference; and
   determining the second coverage enhancement level quality threshold based on the first coverage enhancement level quality threshold and the quality threshold difference.

6. The method according to claim 1, wherein the first uplink coverage enhancement level of the terminal device is an uplink coverage enhancement level of a first uplink carrier, and the method further comprises:
    if the uplink coverage enhancement level of the first uplink carrier is higher than an uplink coverage enhancement level of a supplementary uplink (SUL) carrier, performing uplink transmission by using the SUL carrier, wherein a frequency of the first uplink carrier is higher than a frequency of the SUL carrier, and a higher uplink coverage enhancement level indicates a poorer coverage capability corresponding to the uplink coverage enhancement level of the first uplink carrier.

7. The method according to claim 6, wherein the method further comprises:
    receiving indication information from a network device, wherein the indication information is used to: if the uplink coverage enhancement level of the first uplink carrier is higher than the uplink coverage enhancement level of the SUL carrier, indicate to perform uplink transmission by using the SUL carrier, wherein a higher uplink coverage enhancement level indicates a poorer coverage capability corresponding to the uplink coverage enhancement level of the first uplink carrier.

8. A communication method, comprising:
    obtaining, by a network device, a first downlink coverage enhancement level of a terminal device, wherein the first downlink coverage enhancement level of the terminal device is determined based on downlink signal quality and a first coverage enhancement level quality threshold; and
    obtaining, by the network device, a first uplink coverage enhancement level of the terminal device, wherein the first uplink coverage enhancement level of the terminal device is determined based on the downlink signal quality and a second coverage enhancement level quality threshold, wherein the first coverage enhancement level quality threshold is different from the second coverage enhancement level quality threshold, and wherein the first coverage enhancement level quality threshold and the second coverage enhancement level quality threshold are configured to keep the coverage area of a downlink carrier based on the first coverage enhancement level quality threshold consistent with the coverage area of an uplink carrier based on the second coverage enhancement level quality threshold.

9. The method according to claim 8, wherein the method further comprises: sending, by the network device, first configuration information to the terminal device, wherein the first configuration information is used to indicate a correspondence between a second uplink coverage enhancement level and a first random access configuration; and
    the obtaining, by the network device, the first uplink coverage enhancement level of the terminal device comprises:
    receiving, by the network device, a first random access signal sent by the terminal device; and
    determining, by the network device, the first uplink coverage enhancement level of the terminal device based on the first random access configuration of the first random access signal and the correspondence.

10. The method according to claim 9, wherein the method further comprises: sending, by the network device, second configuration information to the terminal device, wherein the second configuration information is used to indicate a correspondence between a second random access configuration and a combination of the second uplink coverage enhancement level and a second downlink coverage enhancement level; and
    the obtaining, by the network device, the first uplink coverage enhancement level of the terminal device comprises:
    receiving, by the network device, a second random access signal sent by the terminal device; and
    determining, by the network device based on the second random access configuration of the random access signal and the correspondence, the second uplink coverage enhancement level and the second downlink coverage enhancement level that are of the terminal device.

11. The method according to claim 10, wherein the method further comprises:
    sending, by the network device, third configuration information to the terminal device, wherein the third configuration information is used to indicate the second coverage enhancement level quality threshold.

12. The method according to claim 11, wherein the method further comprises:
    sending, by the network device, fourth configuration information to the terminal device, wherein the fourth configuration information is used to indicate a quality threshold difference, and the second coverage enhancement level quality threshold is determined based on the first coverage enhancement level quality threshold and the quality threshold difference.

13. The method according to claim 8, wherein the first uplink coverage enhancement level of the terminal device is an uplink coverage enhancement level of a first uplink carrier, and the method further comprises:
    sending, by the network device, indication information to the terminal device, wherein the indication information is used to: if the uplink coverage enhancement level of the first uplink carrier is higher than an uplink coverage enhancement level of a supplementary uplink (SUL) carrier, indicate to perform uplink transmission by using the SUL carrier, wherein a frequency of the first uplink carrier is higher than a frequency of the SUL carrier, and a higher uplink coverage enhancement level indicates a poorer coverage capability corresponding to the uplink coverage enhancement level of the first uplink carrier.

14. A communications apparatus, comprising at least one circuitry configured to:
    determine downlink signal quality;
    determine a first downlink coverage enhancement level of a terminal device based on the downlink signal quality and a first coverage enhancement level quality threshold; and
    determine a first uplink coverage enhancement level of the terminal device based on the downlink signal quality and a second coverage enhancement level quality threshold, wherein the first coverage enhancement level quality threshold is different from the second coverage enhancement level quality threshold, and wherein the first coverage enhancement level quality threshold and the second coverage enhancement level quality threshold are configured to keep the coverage area of a downlink carrier based on the first coverage enhancement level quality threshold consistent with the coverage area of an uplink carrier based on the second coverage enhancement level quality threshold.

15. The apparatus according to claim 14, wherein the apparatus is further configured to:

receive first configuration information from a network device, wherein the first configuration information is used to indicate a correspondence between a second uplink coverage enhancement level and a first random access configuration;

determine, based on the correspondence, the first random access configuration corresponds to the first uplink coverage enhancement level of the terminal device; and send a first random access signal based on the first random access configuration.

16. The apparatus according to claim 15, wherein the apparatus is further configured to:

receive second configuration information from a network device, wherein the second configuration information is used to indicate a correspondence between a second random access configuration and a combination of the second uplink coverage enhancement level and a second downlink coverage enhancement level;

determine, based on the correspondence, the second random access configuration corresponds to a combination of the second uplink coverage enhancement level and the second downlink coverage enhancement level that are of the terminal device; and send a second random access signal based on the second random access configuration.

17. The apparatus according to claim 16, wherein the apparatus is further configured to:

receive third configuration information from the network device, wherein the third configuration information is used to indicate the second coverage enhancement level quality threshold.

18. The apparatus according to claim 17, wherein the apparatus is further configured to:

receive fourth configuration information from the network device, wherein the fourth configuration information is used to indicate a quality threshold difference; and determine the second coverage enhancement level quality threshold based on the first coverage enhancement level quality threshold and the quality threshold difference.

19. The apparatus according to claim 14, wherein the first uplink coverage enhancement level of the terminal device is an uplink coverage enhancement level of a first uplink carrier, and the apparatus is further configured to:

if the uplink coverage enhancement level of the first uplink carrier is higher than an uplink coverage enhancement level of a supplementary uplink (SUL) carrier, perform uplink transmission by using the SUL carrier, wherein a frequency of the first uplink carrier is higher than a frequency of the SUL carrier, and a higher uplink coverage enhancement level indicates a poorer coverage capability corresponding to the uplink coverage enhancement level of the first uplink carrier.

20. The apparatus according to claim 19, wherein the apparatus is further configured to:

receive indication information from a network device, wherein the indication information is used to: if the uplink coverage enhancement level of the first uplink carrier is higher than the uplink coverage enhancement level of the SUL carrier, indicate to perform uplink transmission by using the SUL carrier, wherein a higher uplink coverage enhancement level indicates a poorer coverage capability corresponding to the uplink coverage enhancement level of the first uplink carrier.

* * * * *